US007533563B2

(12) United States Patent
Horak

(10) Patent No.: US 7,533,563 B2
(45) Date of Patent: May 19, 2009

(54) SYSTEM AND METHOD FOR TESTING FUEL INJECTORS

(76) Inventor: Michael N. Horak, 8204 Baltimore Ave., Apt. 1113-B, College Park, MD (US) 20740

( * ) Notice: Subject to any disclaimer, the term of this patent is extended or adjusted under 35 U.S.C. 154(b) by 97 days.

(21) Appl. No.: 11/896,510

(22) Filed: Sep. 4, 2007

(65) Prior Publication Data

US 2009/0019935 A1 Jan. 22, 2009

Related U.S. Application Data

(60) Provisional application No. 60/950,108, filed on Jul. 16, 2007.

(51) Int. Cl.
*G01M 15/04* (2006.01)

(52) U.S. Cl. .................................................. 73/114.45

(58) Field of Classification Search .............. 73/114.38, 73/114.42, 114.43, 114.45, 114.46, 114.47, 73/114.48, 114.49, 114.51

See application file for complete search history.

(56) References Cited

U.S. PATENT DOCUMENTS

| | | | | |
|---|---|---|---|---|
| 3,842,663 | A | 10/1974 | Harting et al. | |
| 4,523,458 | A | 6/1985 | Daniel | |
| 5,747,684 | A | 5/1998 | Pace et al. | |
| 6,668,633 | B2 | 12/2003 | Hart et al. | |
| 2005/0034514 | A1 * | 2/2005 | Shen | 73/119 A |
| 2006/0101904 | A1 | 5/2006 | Brock | |

* cited by examiner

*Primary Examiner*—Eric S McCall
(74) *Attorney, Agent, or Firm*—Merek, Blackmon & Voorhees, LLC

(57) ABSTRACT

A fuel injector testing system and method that make accurate determination of the condition of an injector installed in an engine possible even if the injector is hidden under or behind engine components. A waveguide attached to the injector guides stress waves generated when the injector pintle is opened or closed to a location on the engine that is accessible by a technician. A stress-wave sensor attached to the accessible end of the waveguide measures the stress-wave intensity and plots on a display its magnitude vs. time. A technician testing a fuel injector can read from the display the numerically accurate impact intensities and the precise timing of the injector pintle opening and closing movements. The display can also compute automatically the values of the impact intensities and the length of time that the injector valve was open. This allows the technician to quickly detect a faulty injector.

33 Claims, 11 Drawing Sheets

SYSTEM AND METHOD FOR TESTING FUEL INJECTORS

RELATED PATENT APPLICATIONS

The subject patent application expressly claims priority from U.S. Provisional Patent Application Ser. No. 60/950,108 filed on Jul. 16, 2007 under 35 USC § 119(e). The entire contents of U.S. Provisional Patent Application Ser. No. 60/950,108 are herein incorporated by reference.

TECHNICAL FIELD

This invention relates generally to methods and apparatus for monitoring and/or testing fuel injectors for internal combustion engines. In its most preferred form, the present invention provides a method and apparatus for monitoring one or more fuel injectors to detect a faulty or worn injector based on stress waves that are guided from the tested injectors, through waveguides, to a stress-wave sensor at an accessible location.

BACKGROUND OF THE INVENTION

There are several methods available for testing the operation of fuel injectors in internal combustion engines. Mechanics often use stethoscopes to listen to the sounds made by fuel injectors. A clicking sound emitted by an injector indicates that the injector pintle is moving. This method will detect injectors that stopped responding altogether, but will miss partially failed injectors. Also, this method cannot be used on injectors that are not accessible by the stethoscope because they are hidden under the intake manifold or under other engine components.

U.S. Pat. No. 6,668,633 discloses a battery-operated fuel injector tester with a probe attached to a pistol-shaped handle. When the probe of the tester is in contact with a tested injector on an idling engine, a light emitting diode flashes and an audible sound is emitted each time the pintle within the fuel injector opens. This tester will detect injectors that stopped responding altogether, but will miss partially failed injectors. Also, this method cannot be used on injectors that are not accessible by the probe because they are hidden under the intake manifold or under other engine components.

U.S. Pat. No. 4,523,458 discloses a fuel injector tester for injectors used in diesel engines. It uses a transducer comprising a piezoelectric crystal sandwiched between two magnets. The transducer is attached magnetically to a tested injector and displays on a bar graph the intensity of the mechanical impulses it measures. This method cannot separate the injector opening transient from the injector closing transient, it does not provide any information on the length of time when the injector valve was open, and it cannot be used on injectors that are not accessible by the transducer because they are hidden under the intake manifold or under other engine components.

U.S. Patent Publication Application No. 2006/0101904 discloses a system where a fuel pressure sensor is installed on the fuel rail and senses fuel pressure fluctuations associated with the operation of the fuel injectors. This method will detect a fuel injector that has failed altogether because the fluctuation expected when that injector was scheduled to open and inject fuel will be missing. However, this method is not accurate enough to reliably detect partially failed fuel injectors.

U.S. Pat. No. 5,747,684 discloses a method for determining the opening and closing times for automotive fuel injectors for use by the engine electronic control unit (ECU) to more accurately control an injector stroke, thereby improving engine performance. This method is based on analyzing the energy content of the acceleration of the injector body, measured by an accelerometer attached to the injector body. The main drawback of this method is that injector body vibrations due to the injector opening transient often do not decay by the time the injector closes, making it difficult to distinguish between the opening and the closing transients. This method also requires an accelerometer permanently attached to each injector.

The most preferred form of the present invention is based on measuring stress waves that are only generated at the exact moments when the injector valve opens or closes. Therefore, in the most preferred form of the present invention, signals due to these two events do not overlap and the opening and closing times can be determined with high accuracy and with minimal computation. Additionally, the most preferred form of the present invention produces numerically accurate measurements of the intensities of the opening and closing transients of the injector valve and it does so with only one sensor per engine.

The art of stress wave measurement is only known to a relatively small community of practitioners as opposed to measurement of vibrations that is well known and widely used.

The term vibration refers to motion of a body in a fashion where all or a significant portion of the body's mass is moving. In an internal combustion engine, for example, there are significant vibrations at the rotational frequency of the crankshaft and at the engine firing frequency. Excitation of engine vibrations requires significant forces and the vibrational motion involves significant energy.

Vibrations can be measured with accelerometers that are attached to the vibrating body. A piezoelectric accelerometer 5 is shown schematically in FIG. 1. The sensor is enclosed in housing 1. Piezoelectric crystal 2 is attached to the bottom of housing 1. Mass 3 is attached to the top of piezoelectric crystal 2. When housing 1 vibrates in the vertical direction with acceleration a, mass 3 applies force m×a on piezoelectric crystal 2, where m is the size of mass 3 measured in units of mass. The applied force generates strain in piezoelectric crystal 2 and said crystal generates electrical charge in response to the strain. The charge is proportional to force m×a and, therefore, is also proportional to acceleration a. Electrical leads 4 can be used to connect the charge to electronic processing circuitry, not shown in FIG. 1, that converts the charge to voltage proportional to acceleration a.

Unlike vibrations, stress waves are elastic waves contained within the solid that comprises the body. These waves are generated by short-duration impacts of the body and they move at the speed of about 5000 m/s through a metallic body. Stress waves in solids can be generated by impacts that involve very low forces and, consequently, the generated waves involve very low amounts of energy as they move through the impacted body. For example, measurable stress waves can be excited in an engine block just by tapping it lightly with a finger. The theory of stress waves generation and propagation is explained in detail in the book *Stress Waves in Solids* by Herbert Kolsky, published by Dover Publications in 1963.

Stress waves in solids can be measured with piezoelectric, fiber-optic, MEMS and other stress-wave sensors. FIG. 2 shows schematically one embodiment of a piezoelectric stress-wave sensor 9 formed in accordance with a preferred embodiment of the invention. The sensor is housed in housing 6. The sensing element is piezoelectric crystal 2. Piezoelectric crystal 2 is permanently attached to face plate 7 that is also the bottom of housing 6. The space inside housing 6 is filled with filler 8 to keep piezoelectric crystal 2 in place and to prevent vibration of the internal components of the sensor. When strain 10 is applied to face plate 7, it reaches piezoelectric crystal 2 and piezoelectric crystal 2 generates electrical charge proportional to strain 10. Signal leads 4 are used to connect the generated charge to electronic processing circuitry not shown in FIG. 2. Note that FIG. 2 is only a schematic representation that excludes design details that are required for high gain and low noise measurements of stress waves.

Stress-wave sensor 9 in FIG. 2 incorporates design features that make its response to case acceleration negligible. These features include crystal material selection, shape of the crystal, and the use of filler 8. Consequently, when sensor-wave sensor 9 undergoes motion that involves acceleration, signal leads 4 do not carry a measurable charge signal due to the acceleration.

SUMMARY OF THE INVENTION

It is an object of a preferred form of this invention to provide a simple, inexpensive and numerically precise method and apparatus for detecting failures and performance degradation of fuel injectors in internal combustion engines. The method and apparatus of the preferred form of the present invention can be utilized even if the performance degradation of the fuel injector is minor and/or the fuel injectors are hidden under or behind engine components.

There is provided, in accordance with a preferred form of the invention, a method for monitoring the stress waves generated by impacts of the pintle of the fuel injector when the injector is activated and deactivated, and determining the condition of the injector by comparing the stress-wave intensity signals during activation and deactivation to those of other injectors in the engine, or to documented characteristics of an injector that is known to be in good operational condition, or to signals from the same injector that were collected and stored during past inspections. Additionally, the preferred method can be used to accurately measure the time during which the injector pintle valve was open. Preferably, the stress waves generated by a tested injector that is hidden under or behind engine components are guided through waveguides to a location that is accessible by a stress-wave sensor, allowing the testing of fuel injectors that are hidden under or behind engine components.

DETAILED DESCRIPTION OF THE PREFERRED EMBODIMENT

The preferred forms of the invention will now be described with reference to the accompanying drawings. The appended claims are not limited to the preferred forms and no term and/or phrase used herein is to be given a meaning other than its ordinary meaning unless it is expressly stated otherwise.

Figure 3:
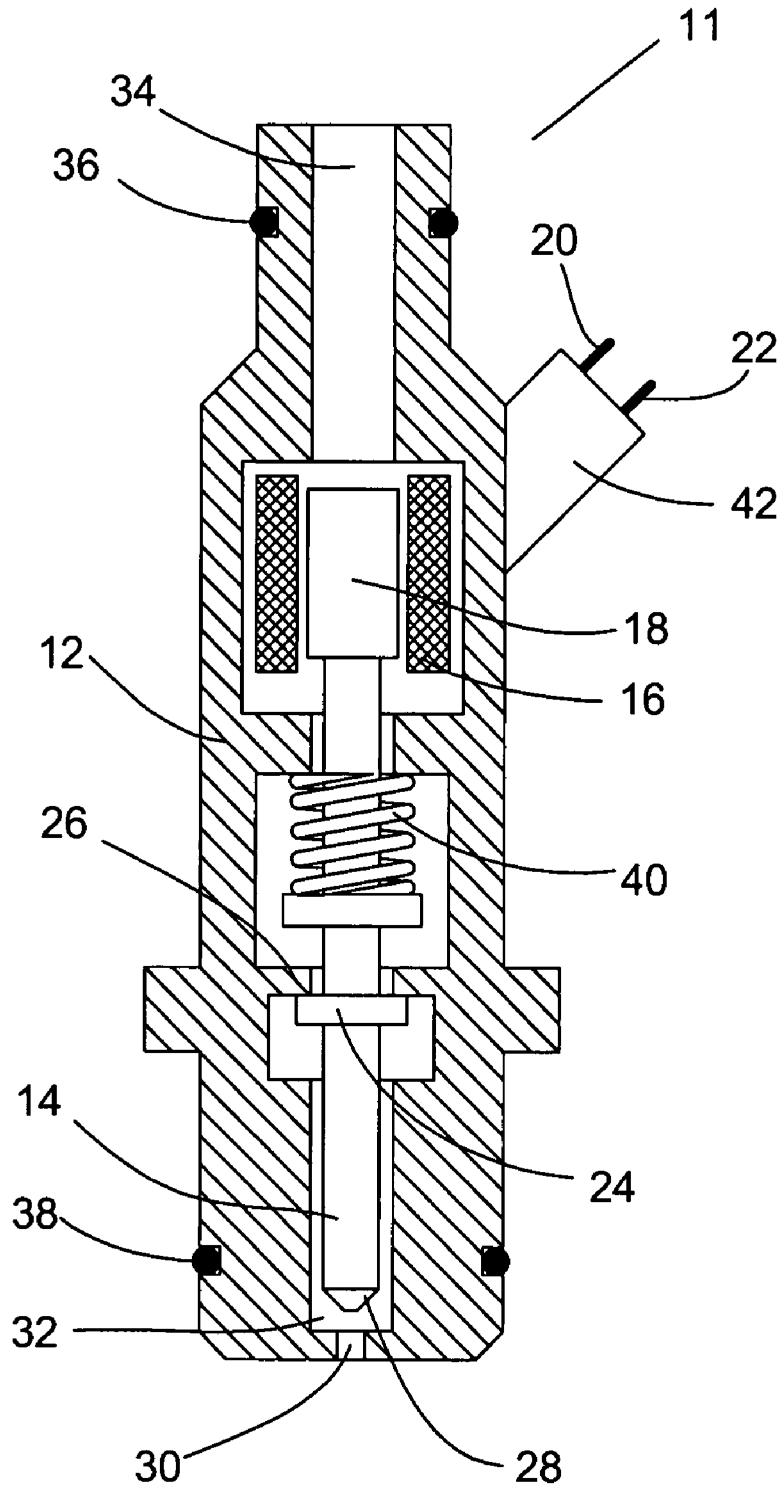
FIG. 3 is a sectional view of a conventional electromagnetically-actuated fuel injector for internal combustion engines.

FIG. 3 presents a conventional fuel injector 11. Injector body 12 houses axially movable injector pintle 14 and solenoid coil 16 that is fixed to the injector body 12. Solenoid armature 18 is attached to injector pintle 14. When injector 11 is activated by applying voltage across the solenoid contacts 20 and 22, magnetic flux generated in the solenoid coil 16 pulls the solenoid armature 18 toward the center of the solenoid coil 16. The location of the injector pintle 14 when the injector 11 is activated is determined by the pintle stop 24 that comes in contact with the injector body stop 26 on injector body 12.

FIG. 3 shows the conventional fuel injector 11 in the activated state. The pintle sealing surface 28 is away from the orifice 30 so that fuel 32 can be sprayed through the orifice 30. Fuel 32 is being supplied pressurized through the injector inlet 34 and through internal passages in injector body 12 that are not shown in FIG. 3. Injector inlet 34 is connected to a fuel pump through a fuel rail that is not shown in FIG. 3. Seal 36 provides sealing between the injector body 12 and the fuel rail. Seal 38 provides sealing between injector body 12 and the internal combustion engine, which is not shown in FIG. 3.

When injector 11 is deactivated by disconnecting the voltage applied across solenoid contacts 20 and 22, spring 40 moves the injector pintle 14 toward the orifice 30, and valve sealing surface 28 closes the inlet to orifice 30. In the deactivated state of the injector 11, fuel 32 is not sprayed through orifice 30.

Injector 11 is shown in FIG. 3 with electromagnetic valve actuation means. However, one skilled in the art would recognize that the invention applies to injectors with other means of actuation, including piezoelectric, magnetostrictive, pneumatic, mechanical, and actuation by fuel pressure. Furthermore, injector 11 is shown in FIG. 3 with one type of orifice 30 and one type of pintle sealing surface 28. However, one skilled in the art would recognize that the invention applies to injectors with any other type of orifice and sealing surfaces, such as a spherical pintle sealing surface 28, a flat pintle sealing surface 28, and a design with a conical orifice 30 and a conical sealing surface 28.

Figure 4:
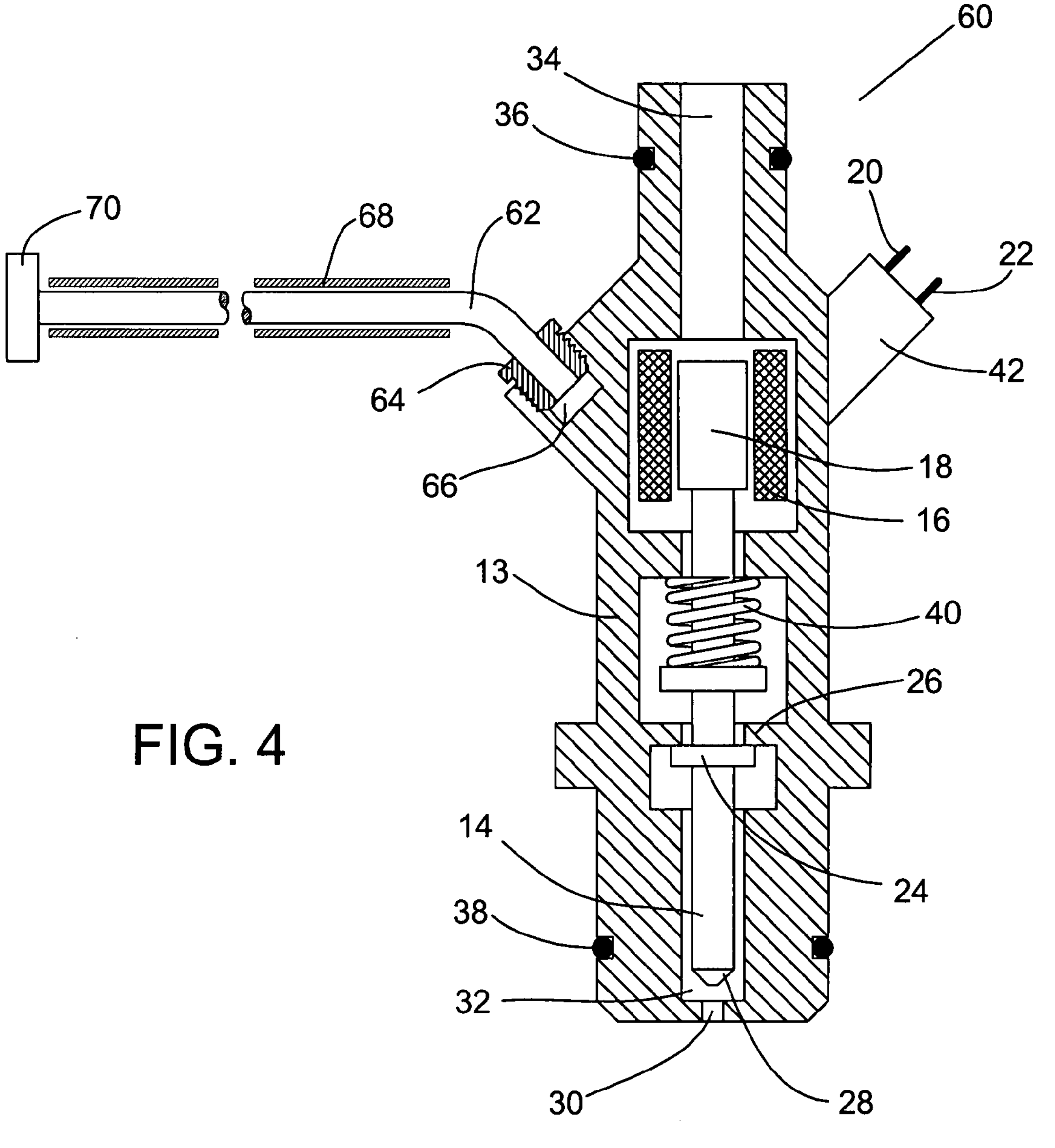
FIG. 4 is a sectional view of a fuel injector with a modified body and equipped with a stress-wave waveguide in accordance with a preferred embodiment of the present invention.

FIG. 4 shows fuel injector 60 according to a preferred form of the present invention. A stress-wave waveguide 62, made of metal, plastics or other suitable material, is attached to the modified injector body 13 by means of plug 64. Plug 64 presses the waveguide flange 66 into modified injector body 13 so that stress waves generated at the instant when pintle stop 24 impacts the injector body stop 26 when the injector 60 is activated, or when pintle sealing surface 28 impacts orifice 30 when the injector 60 is deactivated, can propagate into waveguide 62.

Waveguide 62 is protected from stress waves that do not originate in injector body 13 by sleeve 68 that is made of substantially soft and heat-resistant material, such as silicone foam rubber. At the end of waveguide 62 is sensor attachment surface 70. A stress-wave sensor attached to sensor attachment surface 70 can, therefore, measure the stress waves generated when injector 60 is activated or deactivated and generates stress waves that propagate along waveguide 62 into sensor attachment surface 70.

Figure 5:
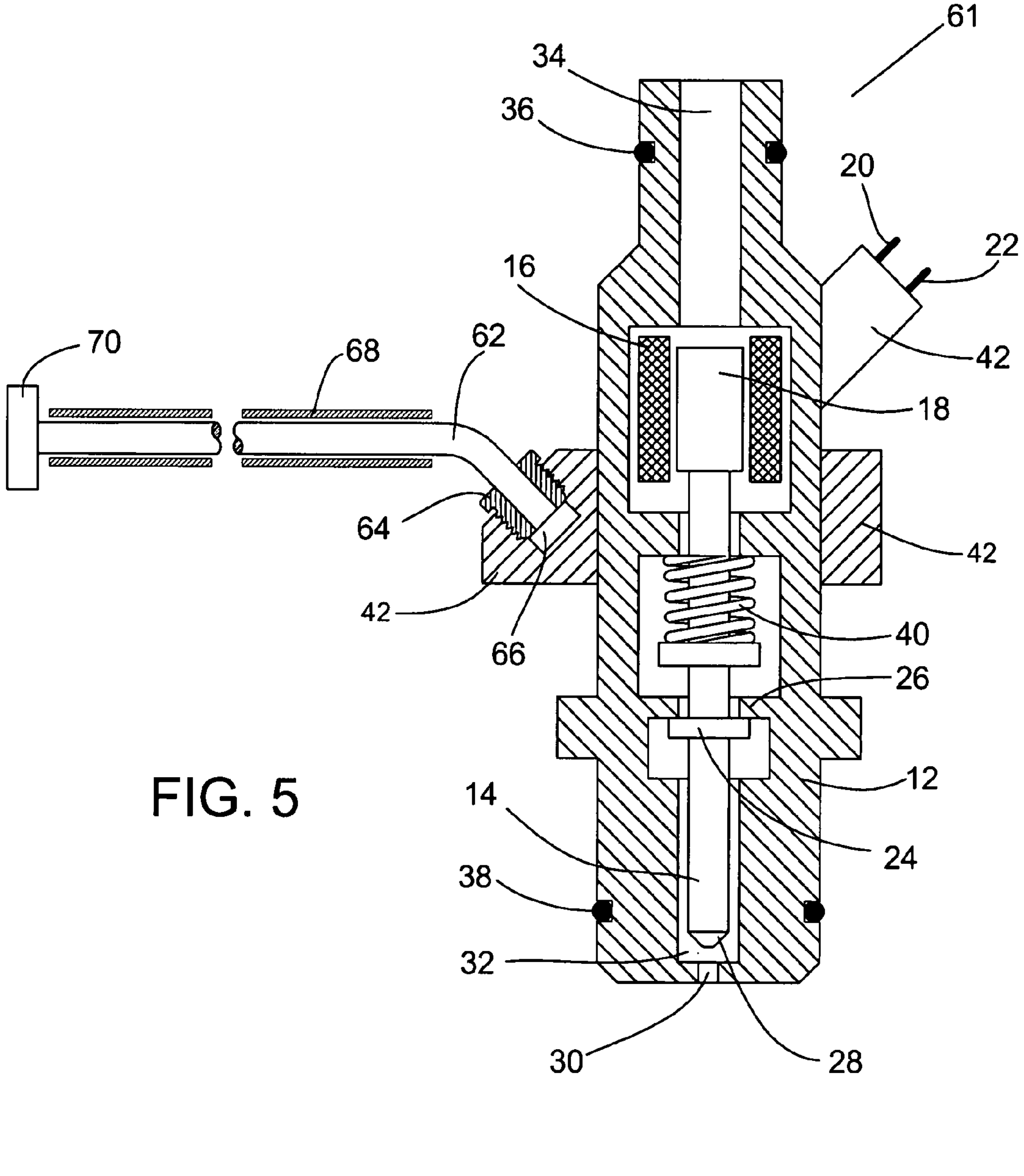
FIG. 5 is a sectional view of a fuel injector with an unmodified body but with an adapter for attaching to the injector body a stress-wave waveguide in accordance with a preferred embodiment of the present invention.

One skilled in the art would recognize that the invention applies to any other type of attachment of a stress-wave waveguide to a fuel injector body, such as a threaded waveguide end, a press fit, a clamp, and attachment by adhesives such as epoxy. A particularly important alternative method of attaching a stress-wave waveguide to a fuel injector is by means of an adapter that fits on a standard, unmodified injector. Thus, a fuel injector according to a preferred form of the present invention can be realized by installing an additional part on a standard injector. FIG. 5 shows fuel injector 61 according to a preferred form of the present invention and with such alternative waveguide attachment method. Adapter 42 is installed tightly onto injector body 12 by means of a press fit, one or more screws, or any other means. Waveguide 62 is attached to the adapter 42 by means of plug 64. Plug 64 presses the waveguide flange 66 into the adapter 42. Since the interfaces between injector body 12 and adapter 42, and between adapter 42 and waveguide flange 66 are tight, stress waves originating in injector body 12 can propagate into waveguide 62 without significant intensity loss. This alternative method of attaching a stress-wave waveguide to a fuel injector can be applied to injectors that were originally not designed for condition monitoring through stress-wave measurement according to a preferred form of the present invention.

Figure 6:
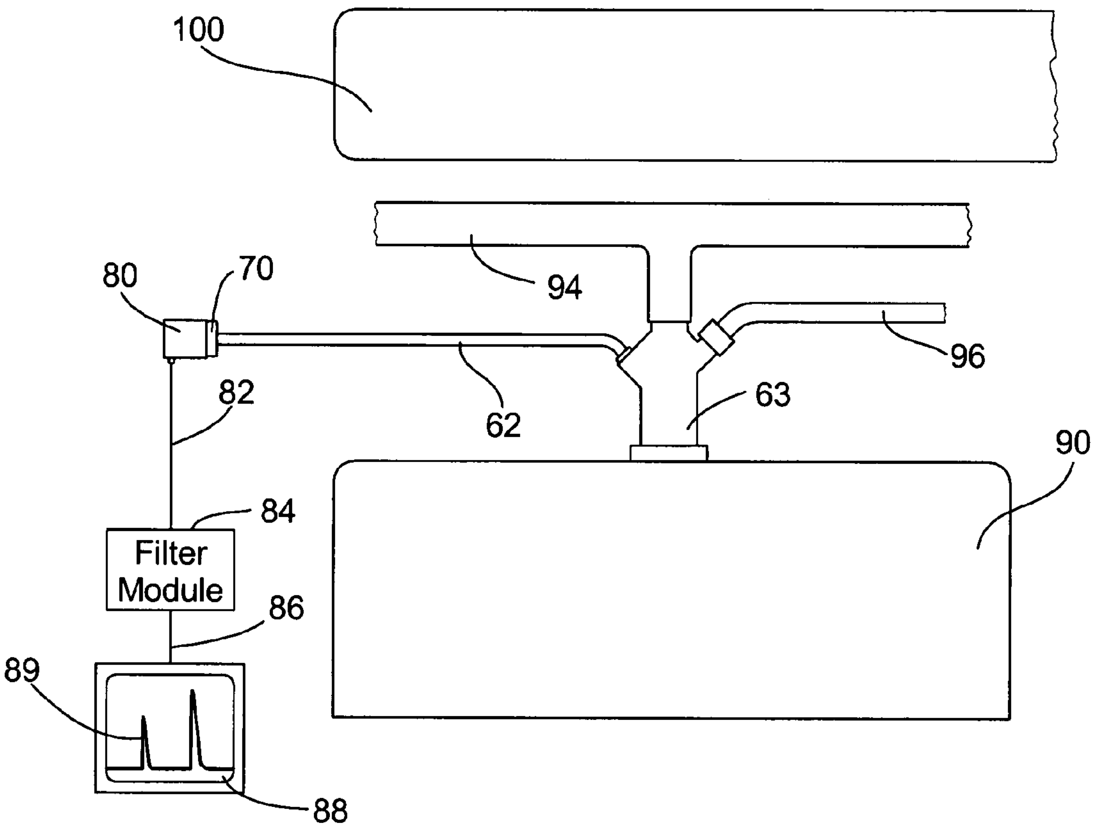
FIG. 6 shows the setup for inspecting a fuel injector equipped with a stress-wave waveguide in accordance with a preferred embodiment of the present invention.

Fuel injector 60 shown in FIG. 4 or fuel injector 61 shown in FIG. 5 can be located under the engine air intake manifold or be hidden under or behind other engine components. However, as long as sensor attachment surface 70 is accessible, fuel injectors 60 or 61 can be easily and accurately inspected by a technician. FIG. 6 shows the setup for testing an injector according to the present invention. Injector 63 is mounted on engine 90. Engine component 100, which represents the air intake manifold or other component, is obstructing access to injector 63. Fuel rail 94 supplies pressurized fuel to injector 63 and other injectors on the engine, and electrical wire harness 96 carries electrical current that is controlled by the engine fuel injection control unit and actuates injector 63. Waveguide 62 is long enough so that sensor attachment surface 70 is out of the area obstructed by engine component 100. Waveguide 62 can be short, such as 10 cm, or long, such as 1 meter, depending on the size of the obstructing engine component 100. Said waveguide 62 can be bent to whatever shape is required to reach from the obstructed location where injector 63 is located to an accessible location. It is so because stress waves propagate well through waveguides of any shape.

Figure 1:
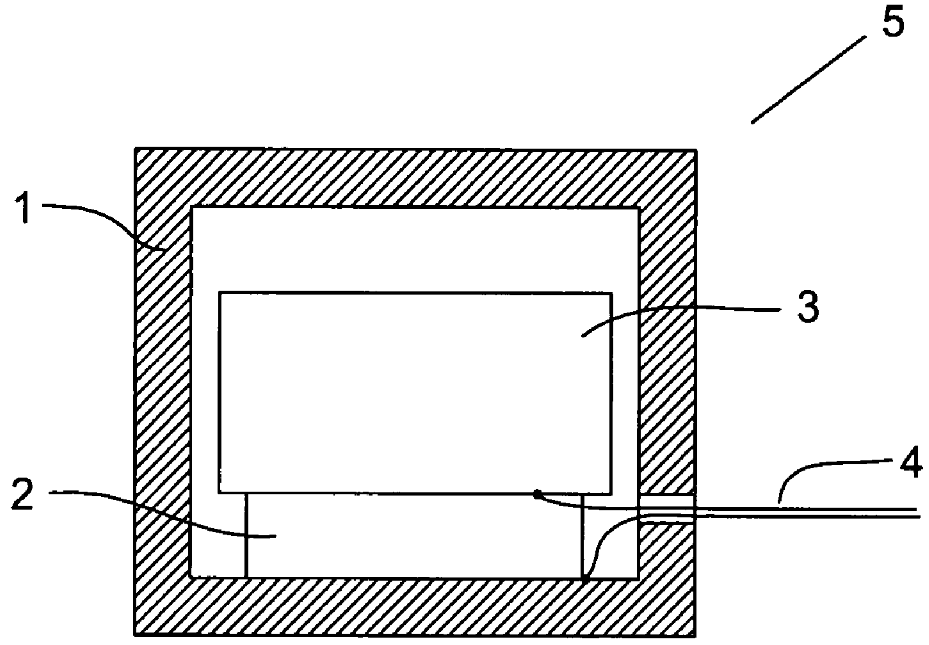
FIG. 1 is a sectional view of a piezoelectric accelerometer.
Figure 2:
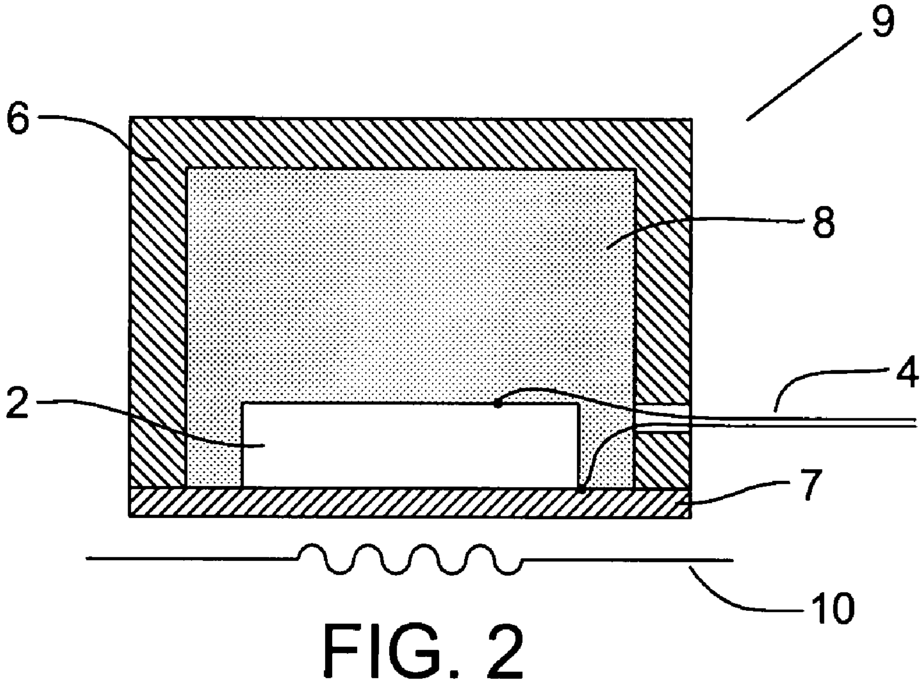
FIG. 2 is a sectional view of a piezoelectric stress-wave sensor.

A stress-wave sensor 80 is shown attached to sensor attachment surface 70. Sensor 80 is attached to sensor attachment surface 70 temporarily with a magnet, a spring or other means by the technician who is testing injector 63. The sensor, preferably a piezoelectric device that generates electrical charge when mechanically stressed, is designed with a natural frequency that is much higher than any forced or natural vibration frequency of engine 90, all its components, and fuel injector 63. Sensor 80 may take the form of piezoelectric sensor 9 illustrated in FIG. 2. Sensor 80 measures two types of signals. Signals of the first type are stress waves due to forced and natural vibrations of engine 90, all its components, and injector 63. These signals have relatively low frequency content. Signal of the second type is a stress wave that passes through waveguide 62 at the instants when injector 63 is activated or deactivated. When the stress wave generated by injector 63 reaches stress-wave sensor 80, it acts as an impulse excitation of very short duration applied to sensor 80. An impulse of very short duration has very high frequency content and it excites high frequency response of sensor 80. One skilled in the art will realize that sensor 80 can be based on principles other than piezoelectricity as long as it can measure high-frequency stress waves.

Cable 82 carries the two types of signals measured by sensor 80 to filter module 84. Module 84 first high-pass filters the arriving signals with the filter corner frequency set above the highest engine vibration frequencies. This filtering process filters out all signals of the first type, i.e., stress waves due to forced and natural vibrations of engine 90, all its components, and injector 63. The only signals left after the high-pass filtering stage are those generated by impulse excitations of sensor 80 due to stress waves that are generated by activation or deactivation of fuel injector 63. Module 84 then amplifies the high-pass filtered signal, rectifies it and extracts the envelope of the rectified signal, so that only the low-frequency envelope of the rectified high-frequency response to the impulse excitations remains. The envelope extraction is accomplished with a low-pass filter. The low-frequency signal leaving module 84 is fed through cable 86 into a display 88 that can be an oscilloscope or a digital device equipped with an analog-to-digital converter. Display 88 in FIG. 6 shows a typical injector signal 89.

Figure 7:
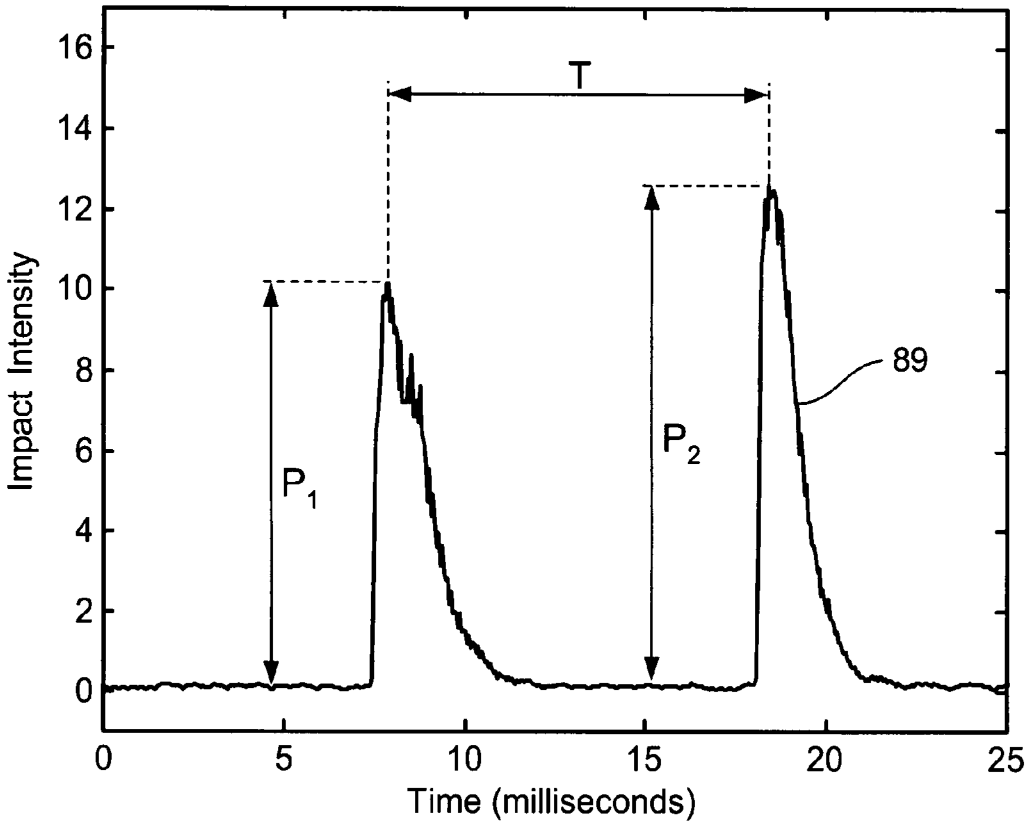
FIG. 7 shows a plot of the stress waves generated by a fuel injector and measured in accordance with a preferred embodiment of the present invention.

An expanded view of the injector signal 89 from display 88 is shown in FIG. 7. It consists of two peaks separated by time T. The first peak is due to the activation of fuel injector 63 and its intensity is $P_1$. The second peak is due to the deactivation of fuel injector 63 and its intensity is $P_2$. The spacing time between the two said peaks, T, is the length of time that injector 63 was open and injected fuel. In a typical idling automobile engine, T is several milliseconds.

The three parameters readable from injector signal 89 shown in FIG. 7, $P_1$, $P_2$ and T, are indicators that carry information on the health condition of injector 63. These three indicators can be compared to nominal values that correspond to an injector in good operational condition. Furthermore, when more than one injector in an engine is tested, a technician can compare the three indicators among all the tested injectors. In a steady idling condition, all injectors that are in good condition have substantially similar stress wave signals and substantially similar indicators computed from said signals. If an engine is misfiring and one injector's indicators deviate from the indicators of the other injector, the technician can determine with high degree of certainty that that injector is not operating properly. For example, a faulty solenoid coil and contamination can cause the impact indicators $P_1$ and $P_2$ to be lower, and can cause the opening time T to be either shorter or longer than in an injector in good operating condition. A faulty electrical circuit that supplies current to the solenoid coil can cause impact indicators $P_1$ and $P_2$ to be lower.

The three injector indicators readable from display 88 in FIG. 6 and shown in FIG. 7, $P_1$, $P_2$ and T, can be also determined automatically if display 88 is a device with computing capability. The computational algorithm for determining automatically the three indicators from a signal like the one shown in FIG. 7, consisting of steps a-g, follows.

a. Find three adjacent candidate peaks $P_i$ that have $n_1$ signal points immediately to the left of $P_i$ that are lower than $P_i$, and $n_1$ signal points immediately to the right of $P_i$ that are lower than $P_i$. Parameter $n_1$ is set so that $n_1 \times \Delta t$ is about 0.3 milliseconds, where $\Delta t$ is the sampling period of the stress wave signal.

b. For each candidate peak $P_i$, compute the average of $n_2$ signal points to the left of the $n_1$ signal points that are before the peak, and call the computed average $g_1$. Parameter $n_2$ is set so that $n_2 \times \Delta t$ is about 0.3 milliseconds.

c. For each candidate peak $P_i$, compute the average of $n_2$ signal points to the right of the $n_1$ signal points that are after the peak, and call the computed average $g_r$.

d. If $r \times g_1 < P_i$ and $r \times g_r < P_i$, candidate peak $P_i$ is a valid peak. Parameter r is set to about 4 and it assures that peak $P_i$ is significantly higher than the points that surround it.

e. If less than three peaks are valid peaks, continue inspecting peaks till three valid adjacent peaks are found.

f. Select the two peaks that are closest to each other out of the three found valid peaks. These two peaks, called $P_1$ and $P_2$, are the opening and closing transients of the injector.

g. $P_1$, $P_2$ and $T = t(P_2) - t(P_1)$ are the three injector indicators, where $t(P_i)$ represents the time of peak $P_i$.

One skilled in the art would recognize that there are other similar forms of this algorithm that still express the same essential algorithm for determining injector indicators $P_1$, $P_2$ and T.

Figure 8:
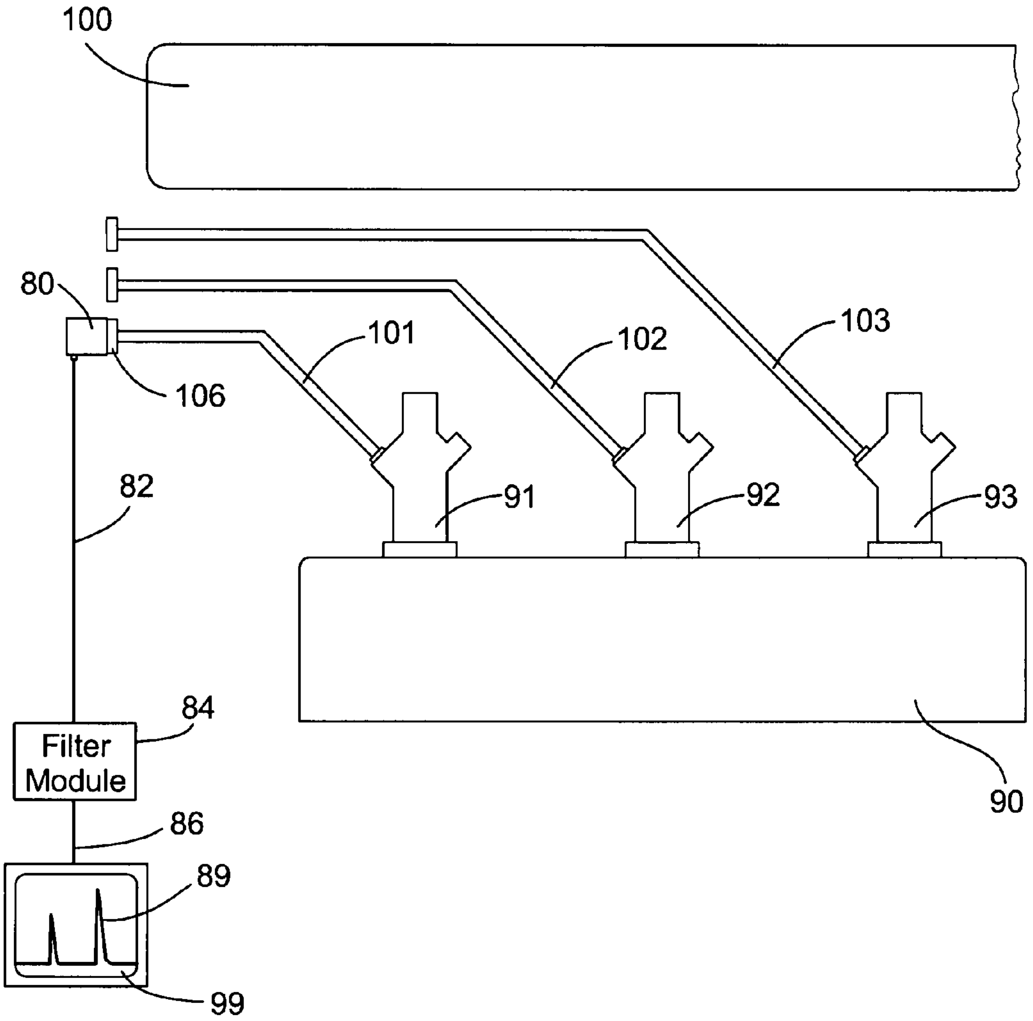
FIG. 8 shows the setup for inspecting multiple fuel injectors with multiple stress-wave waveguides in accordance with a preferred embodiment of the present invention.

FIG. 8 shows a preferred embodiment of the present invention where three fuel injectors 91, 92 and 93 are equipped with dedicated stress-wave waveguides 101, 102 and 103. Each waveguide ends with a sensor attachment surface that is not obstructed by obstructing engine component 100. In this embodiment, these three injectors can represent the three inaccessible injectors in a V6 engine, or three injectors out of any number of inaccessible injectors in any engine configuration. FIG. 8 shows the testing of fuel injector 91 with stress-wave sensor 80 that is attached to sensor attachment surface 106 of waveguide 101. One sensor can be used for testing of all the fuel injectors in an engine by moving it to other sensor attachment surfaces. For clarity, FIG. 8 does not show the injector fuel rail or the injector electrical wire harness.

Figure 9:
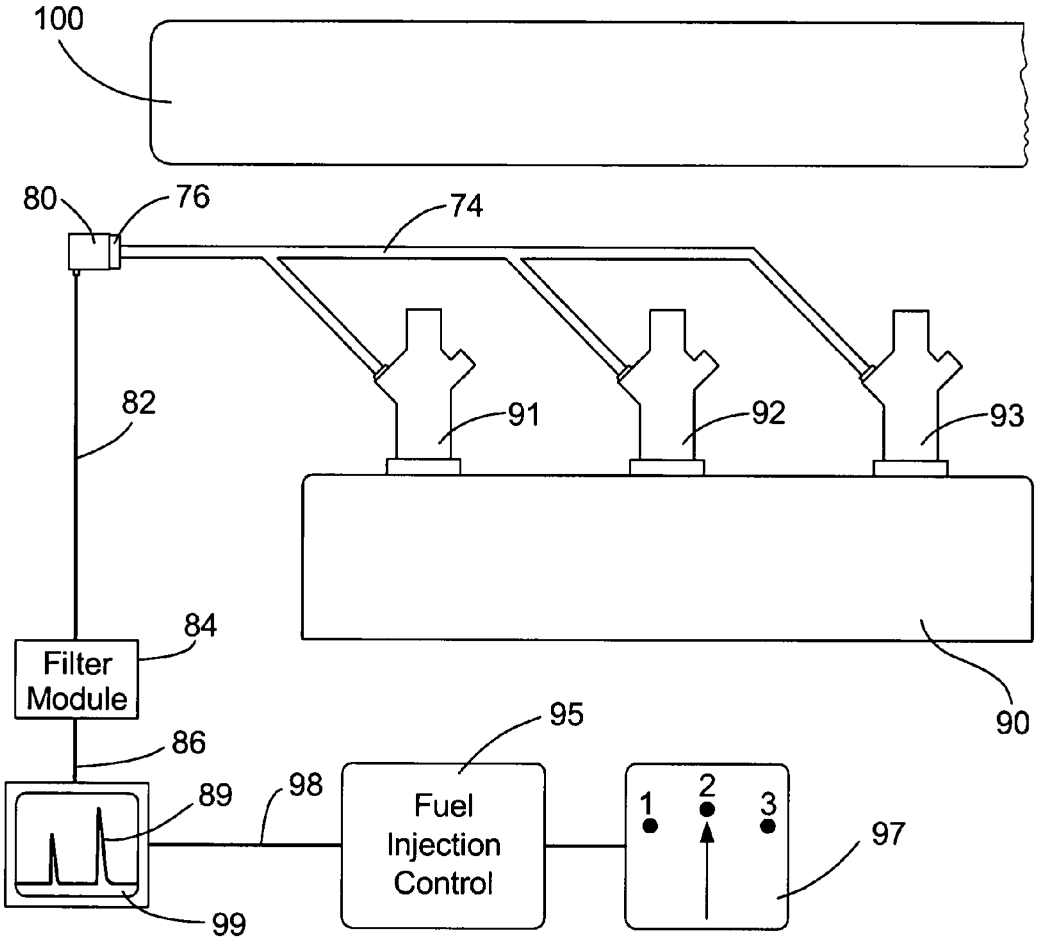
FIG. 9 shows the setup for inspecting multiple fuel injectors with a single stress-wave waveguide and a single stress-wave sensor in accordance with a preferred embodiment of the present invention.

FIG. 9 shows an alternative embodiment of the present invention wherein three fuel injectors 91, 92 and 93 are mounted on engine 90. In this embodiment, these three injectors can represent the three inaccessible injectors in a V6 engine, or three injectors out of any number of inaccessible injectors in any engine configuration. For clarity, FIG. 9 does not show the injector fuel rail or the injector electrical wire harness. All three injectors 91, 92 and 93 in FIG. 9 are coupled to one waveguide 74 which has one sensor attachment surface 76. Consider the engine depicted in FIG. 9 to be of the Sequential Multi-Port Fuel Injection type. In this type of engine, the injectors are activated sequentially (one after the other) so that when the engine is idling, significant time passes between the deactivation of one injector and the activation of the next one. Sensor 80, when attached to sensor attachment surface 76 by a technician, will pick up the activation and deactivation impacts of all three injectors 91, 92 and 93. The impacts will be separated in time because the injectors are activated sequentially. If one of the injectors is not in good condition, the technician will see on the display that its signature differs from the signatures of the other two injectors. However, without additional information, the technician will not know which one of the three injectors produced the signature that indicated faulty operation.

To resolve this injector identification problem, one embodiment of the present invention utilizes an engine fuel injector control unit 95 that produces a selectable injector-specific triggering signal 98. Injector selector 97 allows the technician to select the injector he wants to display by means of a manual switch or other means. In the example in FIG. 9, the injector selector 97 is shown in position 2 that corresponds to injector 92. The engine fuel injector control unit 95 then outputs the selected injector-specific triggering signal 98 a precise period of time, such as 1 millisecond, before it sends activation current to the injector selected by the technician through injector selector 97. Display 99 accepts through cable 86 the processed sensor signal that includes activation and deactivation impacts of all three injectors 91, 92 and 93. Display 99 also accepts the injector-specific triggering signal 98. Upon arrival of the injector-specific triggering signal 98, display 99 captures and displays a short segment, such as 20 milliseconds, of signal arriving via cable 86. Since cylinders in the engine do not fire at the same time, display 99 will capture and display only the activation and the deactivation impacts of the one selected injector 92. By changing the setting of the injector selector 97, the technician can display signals from the three injectors 91, 92 and 93 one at a time and determine if any of them is not in good operational condition.

Alternatively, it is also possible to provide injector selection without the dedicated injector selector 97 shown in FIG. 9. Triggering signal 98 can be provided by a clamp current probe that the technician attaches to a wire that carries current to the injector he wants to monitor. The current probe then generates the triggering signal 98 according to the injector wire to which the probe is attached. Alternatively, triggering signal 98 can be generated by any other means of sensing current or voltage in a wire leading to an injector.

Yet another method for resolving the injector identification problem without the dedicated injector selector 97 is for fuel injection control unit 95 to modulate signal 98 with an injector identification code whenever any of the injectors is activated. For example, signal 98 could be the number of the activated injector transmitted over a serial digital line. Alternatively, signal 98 could be an analog signal that has a voltage level that is indicative to the number of the activated injector, or signal 98 could include the injector number using any other encoding scheme. In these cases, display 99 would include an interface for reading, processing and displaying the injector identification code from signal 98. In one embodiment, display 99 could decode signal 98 and numerically display the number of the injector that produced an injector activation impact peak near the peak shown on the display. One skilled in the art would recognize that the invention applies to other possible methods, either digital or analog, that allow fuel injection control unit 95 to communicate the number of the activated injector to display 99.

The setup of FIG. 9 can also be used to measure the speed of response of injectors. Display 99 can be programmed to display both a time mark corresponding to the instant when current is sent to the injector, and signal 89. The time difference between the said time mark and peak $P_1$ is the injector activation time delay $d_1$. It can be compared to a maximum allowed delay, or compared to time delays of the other injectors. An injector in good condition has a time delay that is shorter than a maximum allowed delay. Similarly, one can also measure the injector deactivation delay $d_2$, defined as the time delay between when the current to the injector is stopped and time of peak $P_2$. Let these two time delays be called $d_1$ and $d_2$, respectively. They can be added to the three previously defined injector performance indicators $P_1$, $P_2$ and T. Thus, the condition of an injector can be summarized by the five indicators $P_1$, $P_2$, T, $d_1$ and $d_2$.

Furthermore, display 99, when implemented digitally, can provide functionality that helps the technician in comparing injectors to each other, or to a standard. For example, display 99 can include eight or more screen-storage function keys, for examining engines with up to eight cylinders or more. When the technician captures the signal from the injector for engine cylinder No. 1, for example, he can press key No. 1 and store the displayed signal. Similarly, he can store signals from injectors for all the other cylinders in the engine. Using a recall function key on display 99, he can then display simultaneously any number of injector signals, each in different color or different line type. He can also display a standard signal corresponding to an injector in good condition. A scroll key on display 99 can allow the technician to scroll the displayed signals horizontally, to align them in time. This way, the technician can easily detect an injector that is malfunctioning because its signal differs from the signals generated by the other injectors or it differs from the standard signal.

Display 99 can also include data storage means that can store injector signature data collected at different times, allowing performance trending over time. For example, the signatures of all the injectors in an engine can be stored each time a scheduled maintenance is performed. If an engine develops a performance problem, such as misfiring of cylinders, signatures of all the injectors can be acquired and compared to their respective signatures from the most recent scheduled maintenance, when the engine was not misfiring. This will immediately pinpoint a failing injector if it is the cause of the problem. The database of past injectors' signatures can reside on the display 99, or it can be implemented on a central computer in the maintenance facility to which all instruments are networked.

Figure 10:
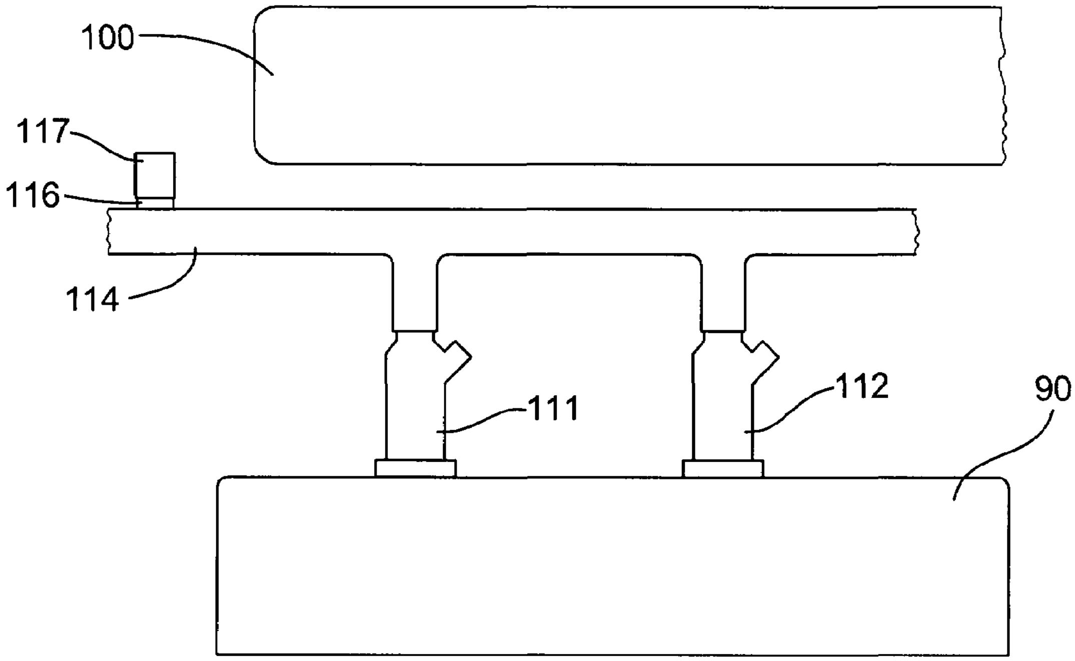
FIG. 10 shows the setup for inspecting multiple fuel injectors with the fuel rail serving as a stress-wave waveguide and a single stress-wave sensor in accordance with a preferred embodiment of the present invention.

In another preferred embodiment of the present invention, the waveguide function in FIG. 9 can be performed by the fuel rail. Fuel rail is usually made of material that transmits stress waves well, and it interconnects multiple injectors in internal combustion engines. Fuel rail 114, shown in FIG. 10, interconnects injectors 111 and 112. Injectors 111 and 112 and fuel rail 114 are designed to provide tight interfaces that facilitate good propagation of stress waves from the injectors to the fuel rail. Sensor attachment surface 116 is attached to fuel rail 114 to facilitate attachment of sensor 117 to said fuel rail. Thus, the functions of waveguide 74 in FIG. 9 can be performed by fuel rail 114 shown in FIG. 10, eliminating the need for a separate waveguide and the need for injectors with waveguide attachment means. For clarity, FIG. 10 does not show the electrical wire harness that interconnects the injectors.

Figure 11:
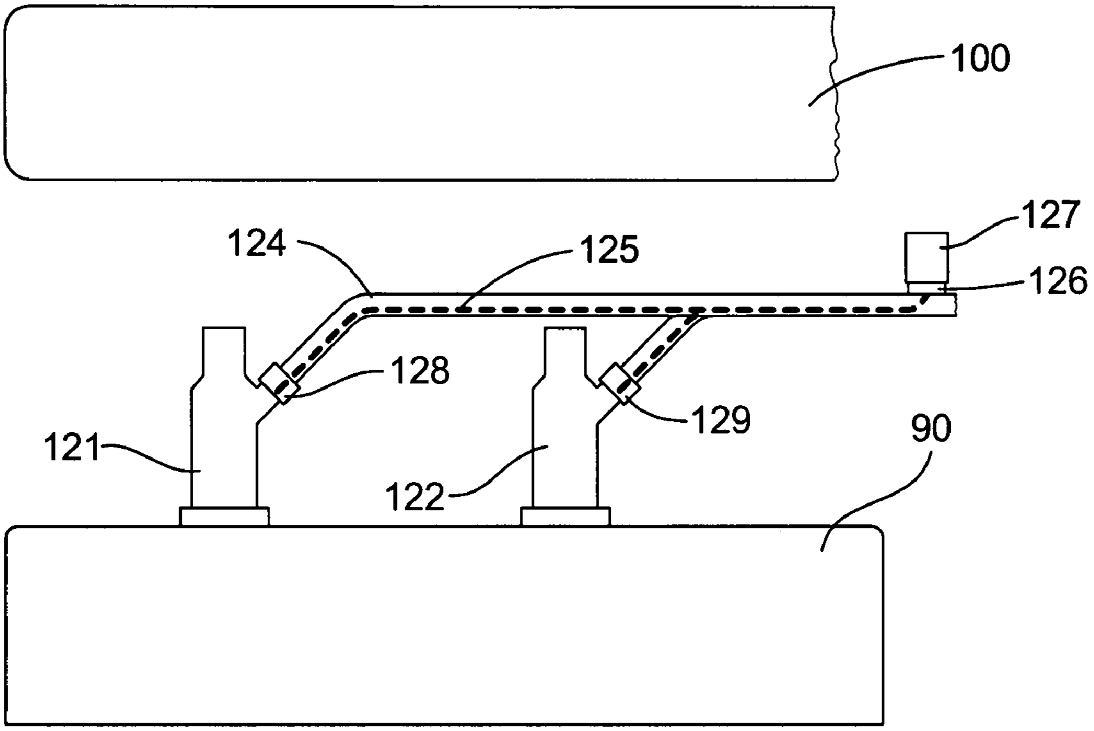
FIG. 11 shows the setup for inspecting multiple fuel injectors with a stress-wave waveguide integrated into an electrical wire harness and a single stress-wave sensor in accordance with a preferred embodiment of the present invention.

Alternatively, the waveguide function in FIG. 9 can be performed by the electrical wire harness that includes the electrical wires that carry injector activation currents. The wire harness interconnects multiple injectors in most internal combustion engines. FIG. 11 shows electrical wire harness 124 interconnecting injectors 121 and 122. Flexible waveguide 125 is integrated into wire harness 124 is and it also interconnects injectors 121 and 122. Tight contacts between waveguide 125 and injectors 121 and 122 are provided by harness connectors 128 and 129. Sensor attachment surface 126 is connected to end of waveguide 125 to facilitate attachment of sensor 127 to said waveguide. Thus, the functions of waveguide 74 in FIG. 9 can be performed by waveguide 125 that is integrated into electrical wire harness 124 as shown in FIG. 11. For clarity, FIG. 11 does not show the fuel rail.

As another alternative, the waveguide function in FIG. 9 can be performed by the intake manifold or other engine part into which the injectors are inserted. Preferably, the stress waves are guided from the injectors to a sensor attachment surface on the manifold by ribs forged into the manifold body, or by waveguides embedded into the walls of the manifold, or by waveguides permanently attached to the surface of the manifold.

Figure 12:
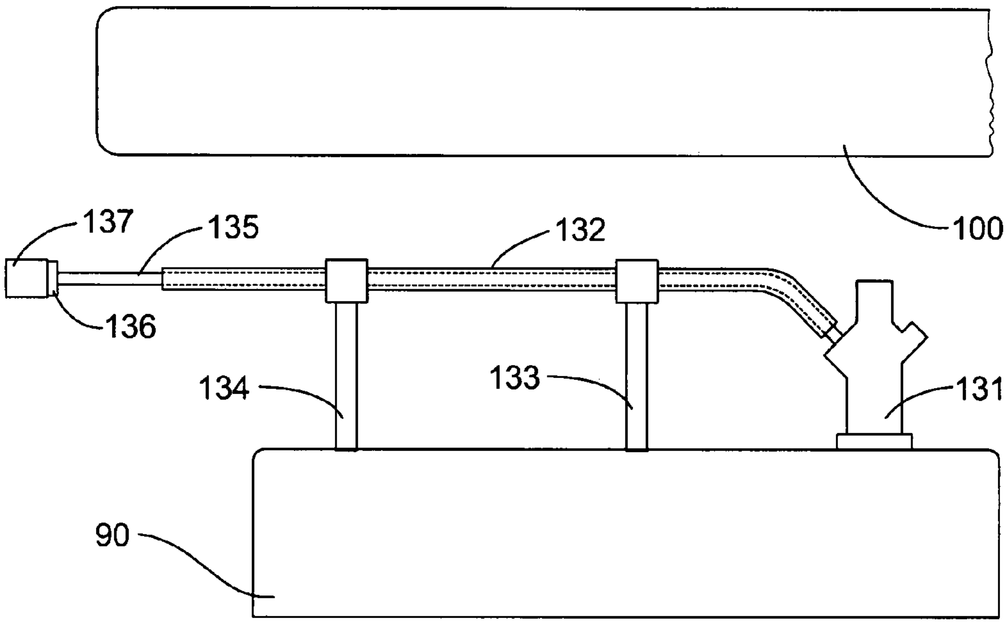
FIG. 12 shows the setup for inspecting a fuel injector with a removable stress-wave waveguide in accordance with a preferred embodiment of the present invention.

In yet another preferred embodiment of the present invention, the waveguide 62 seen in FIG. 4 is not attached permanently to injector body 13. In this embodiment, shown in FIG. 12, insertion guide 132 is permanently attached (i.e., attached during normal engine use and testing) to any suitable engine component or vehicle body component in such a way that one of its ends is at an accessible location and the other end is close to and pointing at injector 131. Any suitable attachment means may be used. FIG. 12 shows attachment of insertion guide 132 by means of guide holders 133 and 134. Removable waveguide 135 is flexible and sufficiently long so that when inserted into the accessible end of insertion guide 132 its end can pass through insertion guide 132 and touch injector 131. When the end of waveguide 135 is pressed into injector 131, stress waves generated inside injector 131 will propagate into waveguide 135 and can be measured with sensor 137 that is attached to sensor attachment surface 136 that is at the accessible end of waveguide 135. A user inserts waveguide 135 into insertion guide 132 only when injector 131 is being tested. FIG. 12 shows removable waveguide 135 when it is inserted into insertion guide 132 and it contacts injector 131. For clarity, FIG. 12 does not show the fuel rail or the electrical wire harness.

A typical use of the preferred forms of the present invention is testing of fuel injectors in an idling engine. However, there are other uses. For example, a technician can use an instrument based on the present invention to acquire the activation and deactivation impacts from all the injectors at a specific operating condition of the engine, such as an automotive engine at a specific driving speed. The acquired signals can be examined once the automobile is back in the maintenance facility. Alternatively, an engine control computer can monitor all the injectors automatically and continuously whenever the engine is running, and detect incipient injector failures before they affect the performance of the engine. This continuous monitoring function can be part of an On-Board Diagnostic system, such as OBD-II that is used in today's automobiles.

Yet another use of the preferred forms of the present invention is to monitor automatically and continuously all the injectors whenever the engine is running, and use the derived information to fine-tune in real time the control laws that govern the activation and deactivation timing of the injectors.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. A method of monitoring at least one fuel injector of an engine to determine whether the fuel injector is operating properly, said method including the steps of:

(a) providing a stress wave sensor for detecting stress transients corresponding to at least one of (i) intensity of an impact of a portion of a fuel injector pintle striking a first portion of a fuel injector body upon opening of said at least one fuel injector, and (ii) intensity of an impact of a portion of the fuel injector pintle striking a second portion of the fuel injector body upon closing of said at least one fuel injector;

(b) measuring stress wave signal corresponding to at least one of (i) intensity of an impact of a portion of the fuel injector pintle striking a first portion of a fuel injector body upon opening of said at least one fuel injector, and (ii) intensity of an impact of a portion of the fuel injector pintle striking a second portion of the fuel injector body upon closing of said at least one fuel injector; and, (c) evaluating stress wave signal measured in step (b) to determine if said at least one fuel injector is operating properly.

2. A method as recited in claim 1, wherein:

(a) an algorithm is used to automatically analyze the stress wave signal corresponding to at least one of (i) intensity of an impact of a portion of the fuel injector pintle striking a first portion of a fuel injector body upon opening of said at least one fuel injector, and (ii) intensity of an impact of a portion of the fuel injector pintle striking a second portion of the fuel injector body upon closing of said at least one fuel injector.

3. A method as recited in claim 1, further including the steps of:

(a) operably associating a high-pass filter with said stress wave sensor to filter out low-frequency stress waves generated by sources other than said fuel injector pintle impacting the first and second portions of the at least one fuel injector.

4. A method as recited in claim 3, further including the steps of:

(a) operably associating a rectifier with said high-pass filter for rectifying an output of said high-pass filter; and, (b) operably associating a low-pass filter with said rectifier for low-pass filtering an output of said rectifier.

5. A method as recited in claim 1, further including the steps of:

(a) measuring stress wave intensity corresponding to intensity of an impact of a portion of the fuel injector pintle striking a first portion of a fuel injector body upon opening of said at least one fuel injector and intensity of an impact of a portion of the fuel injector pintle striking a second portion of the fuel injector body upon closing of said at least one fuel injector; and, (b) evaluating stress wave intensity measured in step (a) to determine if said at least one fuel injector is operating properly.

6. A method as recited in claim 1, further including the step of:

(a) providing a display member for displaying said stress wave signal in waveform.

7. A method as recited in claim 1, further including the steps of:

(a) determining a time interval corresponding to a period of time from an impact of a portion of the fuel injector pintle striking a first portion of a fuel injector body upon opening of said at least one fuel injector to an impact of a portion of the fuel injector pintle striking a second portion of the fuel injector body upon closing of said at least one fuel injector; and, (b) evaluating stress wave signal measured in step (b) of claim 1 along with the said time interval to determine if said at least one fuel injector is operating properly.

8. A method as recited in claim 1, further including the steps of:

(a) determining a delay in activation of the at least one fuel injector.

9. A method as recited in claim 1, further including the step of:

(a) determining a delay in deactivation of the at least one fuel injector.

10. A method as recited in claim 1, further including the step of:

(a) providing at least one stress-wave waveguide for transmitting stress waves generated by at least one of (i) an impact of a portion of the fuel injector pintle striking a first portion of the fuel injector body upon opening of said at least one fuel injector, and (ii) an impact of a portion of the fuel injector pintle striking a second portion of the fuel injector body upon closing of said at least one fuel injector, said at least one stress-wave waveguide includes first and second ends;

(b) operably associating the first end of said stress-wave waveguide with the at least one fuel injector; and, (c) operably associating the second end of said stress-wave waveguide with said stress-wave sensor.

11. A method as recited in claim 10, further including the step of:

(a) providing an insertion guide member operably connected to at least one engine component for facilitating insertion of said stress-wave waveguide into contact with said at least one fuel injector.

12. A method as recited in claim 11, further including the step of:

(a) wherein said insertion guide member remains operably connected to said at least one engine component both during testing and normal use of the engine.

13. A method as recited in claim 1, further including the steps of:

(a) providing at least one stress waveguide having first and second ends (b) operably associating said first end of said at least one stress waveguide to at least one fuel injector of an engine where access to said at least one fuel injector is obstructed by at least one other engine component;

(c) positioning said second end of said at least one stress waveguide such that access to said second end of said at least one stress waveguide is not obstructed by said at least one other engine component; and, (d) operably associating said stress-wave sensor with said second end of said at least one stress waveguide for sensing a signal transmitted through said at least one stress waveguide.

14. A method as recited in claim 13, further including the step of:

(a) forming a port in a portion of an engine for receiving said first end of said at least one stress waveguide.

15. A method as recited in claim 14, wherein:

(a) the port is formed in one of: (i) a body of at least one fuel injector; and (ii) an element in contact with the body of at least one fuel injector.

16. A method as recited in claim 10, further including the steps of:

(a) measuring stress wave signal corresponding to an impact intensity of a portion of a fuel injector pintle striking a first portion of a fuel injector body upon opening of said at least one fuel injector;

(b) measuring stress wave signal corresponding to an impact intensity of a portion of the fuel injector pintle striking a second portion of the fuel injector body upon closing of said at least one fuel injector; and, (c) evaluating the measurements of stress wave signals obtained in paragraphs (a) and (b) of this claim to determine if said at least one fuel injector is operating properly.

17. A method as recited in claim 1, further including the steps of:

(a) simultaneously connecting said stress-wave sensor to at least two fuel injectors; and, (b) monitoring said stress-wave sensor to determine the operating condition of at least one of said two fuel injectors.

18. A method as recited in claim 17, further including the step of:

(a) providing a waveguide for simultaneously connecting said at least two fuel injectors to said stress-wave sensor.

19. A method as recited in claim 18, wherein:

(a) said waveguide is a fuel rail of the engine.

20. A method as recited in claim 18, wherein:

(a) said waveguide is an engine component.

21. A method as recited in claim 18, wherein:

(a) said waveguide is incorporated into an electrical harness of an engine.

22. A method as recited in claim 17, further including the step of:

(a) providing a display member for displaying indicia corresponding to the operating condition.

23. A method as recited in claim 22, wherein:

(a) said indicia is a signal in waveform.

24. A method as recited in claim 22, further including the steps of:

(a) providing a fuel injection control unit; and, (b) operably connecting said fuel injection control unit to said display member such that said fuel injection control unit controls whether indicia corresponding to only one or both of said at least two fuel injectors is displayed at any point in time.

25. A method as recited in claim 22, further including the step of:

(a) simultaneously displaying on said display member indicia corresponding to the at least one condition of each of said at least two fuel injectors.

26. A method as recited in claim 1, further including the steps of:

(a) providing a sensor for detecting signals corresponding to at least one of (i) intensity of an impact of a portion of a fuel injector pintle striking a first portion of a fuel injector body upon opening of said at least one fuel injector, and (ii) intensity of an impact of a portion of the fuel injector pintle striking a second portion of the fuel injector body upon closing of said at least one fuel injector;

(b) at a first time, sensing a signal corresponding to at least one of (i) intensity of an impact of a portion of the fuel injector pintle striking a first portion of a fuel injector body upon opening of said at least one fuel injector, and (ii) intensity of an impact of a portion of the fuel injector pintle striking a second portion of the fuel injector body upon closing of said at least one fuel injector;

providing a storage unit for storing information relating to operability of said at least one fuel injector; and, (c) storing information corresponding to the signal measured in step (b) of claim 1 for subsequent retrieval and use.

27. A method as recited in claim 1, wherein:

(a) evaluation of a stress wave signal in step (c) of claim 1 includes comparison with a stress wave signal measured at a previous time.

28. A method as recited in claim 1, wherein:

(a) evaluation of a stress wave signal in step (c) of claim 1 includes comparison with a stress wave signal from a different fuel injector.

29. A method as recited in claim 10, further including the steps of:

(a) providing a display for displaying a stress-wave signal sensed by said stress-wave sensor; and, (b) displaying a first stress-wave signal sensed by said stress-wave sensor in waveform on said display.

30. A method as recited in claim 29, further including the step of:

(a) displaying a second stress-wave signal in waveform on said display simultaneously with the display of said first stress-wave signal to permit an individual to evaluate performance of the at least one fuel injector.

31. A method as recited in claim 30, wherein:

(a) said first stress-wave signal and said second stress-wave signal are from the same fuel injector.

32. A method as recited in claim 30, wherein:

(a) said first stress-wave signal and said second stress-wave signal are from different fuel injectors.

33. A method as recited in claim 2, further including the step of:

(a) providing indicia computed by the algorithm to one of a fuel injector control unit and an engine on-board diagnostic system.

* * * * *